United States Patent
Outwater et al.

(10) Patent No.: US 10,245,967 B2
(45) Date of Patent: Apr. 2, 2019

(54) SYSTEM AND METHOD FOR MANAGING VEHICLE CHARGING STATIONS

(71) Applicants: Christopher Scott Outwater, Santa Barbara, CA (US); William Gibbens Redmann, Glendale, CA (US)

(72) Inventors: Christopher Scott Outwater, Santa Barbara, CA (US); William Gibbens Redmann, Glendale, CA (US)

(73) Assignee: Liberty Plugins, Inc., Santa Barbara, CA (US)

(*) Notice: Subject to any disclaimer, the term of this patent is extended or adjusted under 35 U.S.C. 154(b) by 100 days.

(21) Appl. No.: 14/436,753

(22) PCT Filed: Oct. 17, 2013

(86) PCT No.: PCT/US2013/065412
§ 371 (c)(1),
(2) Date: Apr. 17, 2015

(87) PCT Pub. No.: WO2014/062909
PCT Pub. Date: Apr. 24, 2014

(65) Prior Publication Data
US 2016/0176306 A1    Jun. 23, 2016

Related U.S. Application Data

(60) Provisional application No. 61/715,856, filed on Oct. 19, 2012.

(51) Int. Cl.
*B60L 11/18*    (2006.01)

(52) U.S. Cl.
CPC .......... *B60L 11/1844* (2013.01); *B60L 11/18* (2013.01); *B60L 11/1816* (2013.01);
(Continued)

(58) Field of Classification Search
CPC .. B60L 11/1844; B60L 11/18; B60L 11/1816; B60L 11/1825; B60L 11/1842;
(Continued)

(56) References Cited

U.S. PATENT DOCUMENTS 8,013,570 B2 * 9/2011 Baxter .................. B60L 3/0084
320/101
8,731,730 B2 * 5/2014 Watkins .................... G06F 1/28
320/107

(Continued)

OTHER PUBLICATIONS

PCT Search Report for PCT/US13/65412, KPO, dated Mar. 12, 2014.

*Primary Examiner* — M. N. Von Buhr
(74) *Attorney, Agent, or Firm* — Clifford H. Kraft

(57) ABSTRACT

A system and method for managing vehicle charging stations such that when at least two of a plurality of electric vehicle charging stations (also known as electric vehicle service equipment, or EVSE) occupied with vehicles awaiting a charge, the present system manages the charging of individual vehicles in cases where the aggregated demand for charging exceeds the capacity of the circuits supplying the plurality of EVSE. By cycling so that only a few of the vehicles are charging at a time, the demand on the circuits is kept below a predetermined limit. In cases where a load shedding event is in progress, the limit can be further reduced. In cases where the cost of electricity is varying dynamically, the system considers a driver's explicit charging requirements (if any) and preferences for opportunistic charging when the price of electricity is not too high.

20 Claims, 11 Drawing Sheets

(52) U.S. Cl.
CPC ....... *B60L 11/1825* (2013.01); *B60L 11/1842* (2013.01); *B60L 11/1846* (2013.01); *B60L 11/1848* (2013.01); *B60L 11/1861* (2013.01); *B60L 2230/16* (2013.01); *B60L 2230/40* (2013.01); *B60L 2240/34* (2013.01); *B60L 2240/545* (2013.01); *B60L 2240/70* (2013.01); *B60L 2240/72* (2013.01); *Y02E 60/721* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 10/92* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC .............. B60L 11/1846; B60L 11/1848; B60L 11/1861; B60L 2230/40; B60L 2230/16; B60L 2240/34; B60L 2240/545; B60L 2240/70; B60L 2240/72; Y02T 90/121; Y02T 90/14; Y02T 90/169; Y02T 90/168; Y02T 90/163; Y02T 90/16; Y02T 90/128; Y02T 10/92; Y02T 10/7291; Y02T 10/705; Y02T 10/7044; Y02T 10/7088; Y02T 10/7005; Y02E 60/721; Y04S 30/14; Y04S 30/12; Y04S 10/126

See application file for complete search history.

(56) References Cited

U.S. PATENT DOCUMENTS

| | | | |
|---|---|---|---|
| 2010/0017249 A1* | 1/2010 | Fincham | B60L 3/12 705/412 |
| 2010/0295507 A1* | 11/2010 | Ishii | B60K 6/445 320/109 |
| 2011/0078092 A1* | 3/2011 | Kim | B60L 11/1824 705/412 |
| 2011/0144823 A1* | 6/2011 | Muller | B60L 3/04 700/297 |
| 2012/0229089 A1* | 9/2012 | Bemmel | H02J 7/0013 320/109 |

\* cited by examiner

```
300
  ↘
310 — <?xml version="1.0"?>
311 — <EnergyPriceList>
320 — <Currency>Dollars</Currency>
321 — <Price>
322 — <Level>1</Level>
323 — <KwhRate>0.0123</KwhRate>
324 — <StartDate>2012-10-18T09:00:00</StartDate>
325 — <EndDate>2012-10-18T09:15:00</EndDate>
330 — </Price>
331 — <Price>
332 — <Level>1</Level>
333 — <KwhRate>0.0126</KwhRate>
334 — <StartDate>2012-10-18T09:15:00</StartDate>
335 — <EndDate>2012-10-18T09:30:00</EndDate>
340 — </Price>
341 — <Price>
342 — <Level>1</Level>
343 — <KwhRate>0.014</KwhRate>
344 — <StartDate>2012-10-18T09:30:00</StartDate>
345 — <EndDate>2012-10-18T09:45:00</EndDate>
350 — </Price>
351 — <Price>
352 — <Level>1</Level>
353 — <KwhRate>0.0128</KwhRate>
354 — <StartDate>2012-10-18T09:45:00</StartDate>
355 — <EndDate>2012-10-18T10:00:00</EndDate>
312 — </Price>
      </EnergyPricesList>
```

FIGURE 3

```
400
    <?xml version="1.0"?>
410
    <UsageReport>
411
      <ReportID>11111111-1111-1111-1111-111111111111</ReportID>
412
      <ControlID>22222222-2222-2222-2222-222222222222</ControlID>
413
      <CreationDate>2012-10-18T11:23:45</CreationDate>
414
      <UsageList>
420
        <Usage>
421
          <UsageID>33333333-3333-3333-3333-333333333333</UsageID>
422
          <AccountID>33333333</AccountID>
423
          <KWH>6.03</KWH>
424
          <KwhRate>0.0126</KwhRate>
425
          <StartDate>2012-10-18T09:17:00</StartDate>
426
          <EndDate>2012-10-18T09:30:00</StartDate>
427
        </Usage>
430
        <Usage>
431
          <UsageID>44444444-4444-4444-4444-444444444444</UsageID>
432
          <AccountID>44444444</AccountID>
433
          <KWH>4.11</KWH>
434
          <KwhRate>0.0126</KwhRate>
435
          <StartDate>2012-10-18T09:18:00</StartDate>
436
          <EndDate>2012-10-18T09:30:00</EndDate>
437
        </Usage>
440
        <Usage>
441
          <UsageID>55555555-5555-5555-5555-555555555555</UsageID>
442
          <AccountID>44444444</AccountID>
443
          <KWH>10.27</KWH>
444
          <KwhRate>0.014</KwhRate>
445
          <StartDate>2012-10-18T09:30:00</StartDate>
446
          <EndDate>2012-10-18T09:45:00</EndDate>
447
        </Usage>
```

FIGURE 4A 400 (continued)

```
450 ─── <Usage>
451 ───   <UsageID> 66666666-6666-6666-6666-666666666666</UsageID>
452 ───   <AccountID>33333333</AccountID>
453 ───   <KWH>6.48</KWH>
454 ───   <KwhRate>0.0128</KwhRate>
455 ───   <StartDate>2012-10-18T09:45:00</StartDate>
456 ───   <EndDate>2012-10-18T09:59:00</EndDate>
457 ─── </Usage>
460 ─── <Usage>
461 ───   <UsageID> 77777777-7777-7777-7777-777777777777</UsageID>
462 ───   <AccountID>44444444</AccountID>
463 ───   <KWH>4.80</KWH>
464 ───   <KwhRate>0.0128</KwhRate>
465 ───   <StartDate>2012-10-18T09:45:00</StartDate>
466 ───   <EndDate>2012-10-18T10:00:00</EndDate>
467 ─── </Usage>
415 ─── </UsageList>
416 ─── </UsageReport>
```

FIGURE 4B

SYSTEM AND METHOD FOR MANAGING VEHICLE CHARGING STATIONS

This is a United States National Phase entry from application PCT/US13/65412 with international filing date of Oct. 17, 2013 which claimed priority from U.S. Provisional Patent Application No. 61/715,856 filed Oct. 19, 2012. The international priority date is Oct. 19, 2012. Applications PCT/US13/65412 and 61/715,856 are hereby incorporated by reference in their entireties.

BACKGROUND

Field of the Invention

The present invention relates generally to Electric Vehicle Service Equipment (EVSE) and more particularly to a system and method for managing vehicle charging stations.

Description of the Prior Art

In most cases, a driver is not disposed to wait while an electric vehicle charges. A substantial portion of all vehicle charging will occur while the vehicle is parked for an extended period of time.

Large numbers of electric vehicles will promote the installation of large banks of electric vehicle service equipment (EVSE). EVSEs are commonly called "chargers", even though this is not technically precise.

Even though large banks of EVSE are made available, and some or all of them might be occupied by an electric vehicle at a time, it can be the case that the aggregate demand for charging of the vehicles may exceed the amount of electric power available for use by the bank. This may be the case, for example, if the operator of the bank (e.g., an employer) has chosen to place a limit on how much electricity is supplied to the employees or guests in a building. Another example might find that the electrical service is completely adequate to operate all of the EVSE at full power, but during a load-shedding event, that capacity is artificially reduced by agreement between the power company and the operator of the bank. In still another example, whether or not the electrical service can support all the EVSE operating at full power, an operator may choose to limit the peak draw from the mains, so as not be classified as a certain kind of customer (i.e., one whose peak draw exceeds a particular value and under some tariffs can be charged higher rates for all power consumed).

Prior art systems control multiple EVSE to mitigate peak demand, but do not consider the timing requirement of individual drivers as stipulated by their requirements or expressed willingness to purchase additional electricity (i.e., charge) if the price is sufficiently low. Additionally, a system should be fair, that is, according to policy, it should operate in the short term on a first-come, first-served basis, but in the longer term, whatever electricity is available within the prescribed limits, should be made available to those needing it, or who are otherwise willing to purchase it. Individual preferences with respect to pricing should be respected, but an implementation should not differentially advantage or disadvantage individual drivers with respect to availability of electricity when the price is particularly low: All drivers should have equal (at least, statistically equal) access whenever the price is sufficiently low.

SUMMARY OF THE INVENTION

The present invention relates to a system for fairly managing a bank of EVSEs that includes a controller having control over a group of EVSEs. The controller typically has a queue of requests for charging corresponding to at least some of the EVSEs in the bank. The controller selects from among the requests in the queue and enables the corresponding EVSEs such that the aggregate power draw of the enabled EVSEs does not exceed a first predetermined limit. The controller subsequently disables the corresponding EVSEs and returns those requests to the queue. The controller may have a detector for load shedding events, and in the case of a load shed event being detected, can further ensure that the aggregate power draw of the enabled EVSEs does not exceed a second predetermined limit, where the second limit is less than the first limit. The controller further can have access to a price feed and user preferences indicating a minimum energy requirement and acceptable price for additional energy. In this case, the controller may skip a corresponding request in the queue once the minimum energy requirement has been met and while the price feed indicates a current price for electricity that exceeds the acceptable price.

DESCRIPTION OF THE FIGURES

Attention is now directed to several drawings that illustrate features of the present invention:

FIG. 3 is an embodiment of an energy price file containing electricity prices as projected over several intervals in the near future.

FIGS. 4A-4B together, show one example embodiment of a usage report file containing records of EVSE use authorized to the accounts of individual users, tracking when and how much electricity was used, and at what price.

Several drawings have been presented to aid in understanding the present invention. The scope of the present invention is not limited to what is shown in the figures.

DETAILED DESCRIPTION

Figure 1:
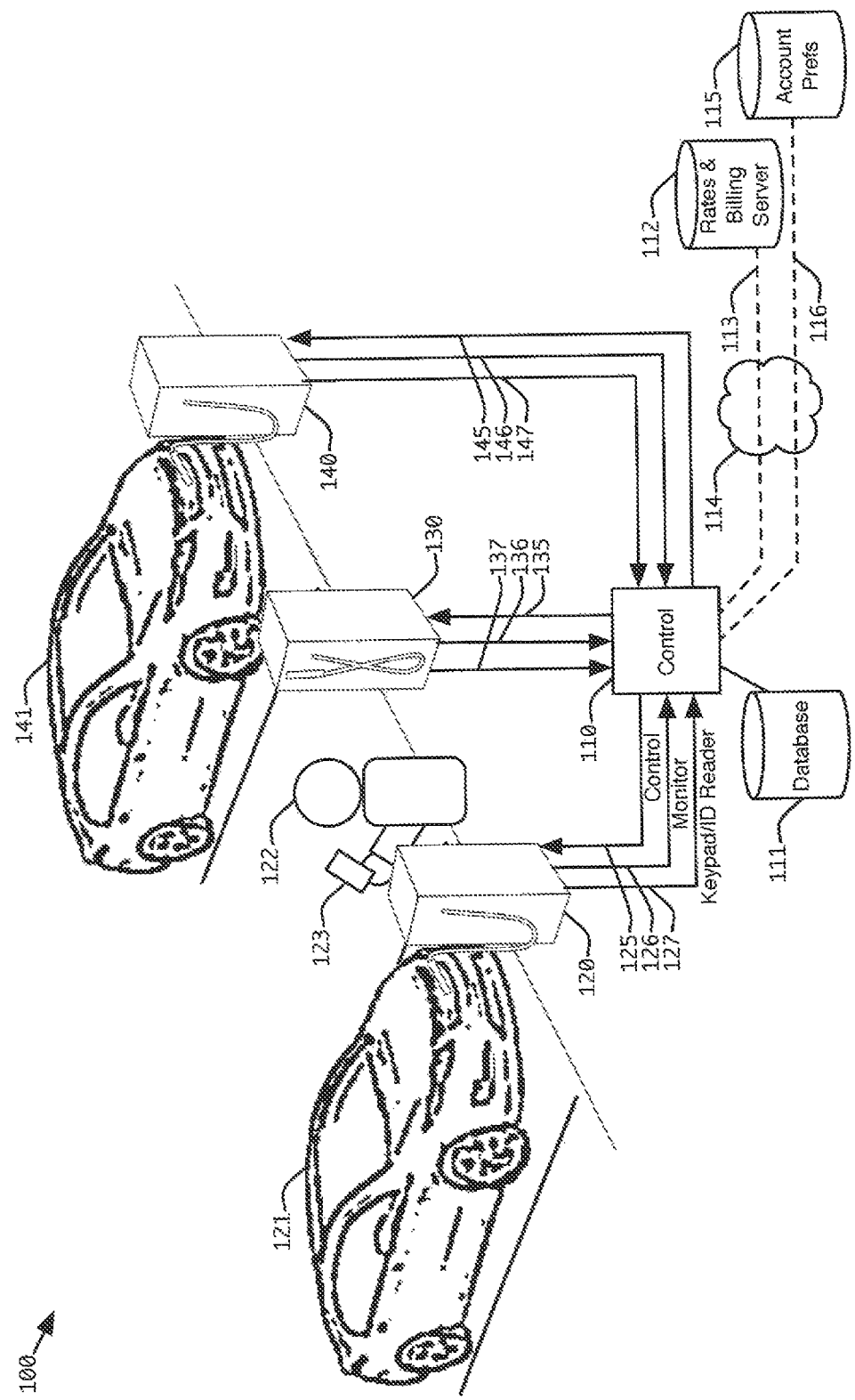
FIG. 1 is a system block diagram for one example embodiment of the electric vehicle charging system.

FIG. 1 is a system block diagram for one example embodiment of the electric vehicle charging system 100, in which three EVSEs are shown to be managed by controller 110. User 122 offers identification 123, which may be read by a reader (not shown) in proximity to each EVSE, or centrally located, e.g., near controller 110. Alternatively, the identification may be a code entered by the user onto a keypad (not shown in FIG. 1). The keypad entry or identification read is transmitted to the controller 110 by keypad/

ID reader signal 127. The system has access to a user's preferences (e.g., how much electricity he is willing to buy at what price), which may be stored in a database 115. Current electricity rates are supplied to the controller, and usage is stored. Only occasional connection to remote databases are required, which may be by connections 113, 116, which may comprise the Internet 114; or may be achieved by other mechanisms (e.g., a "data mule" technique). The controller monitors and manages each EVSE, e.g., 120 with control line 125, usage monitor line 126. Each EVSE in the bank of EVSEs shown in FIG. 1 can be managed by controller 110 in a manner similar to that for EVSE 120, that is, EVSE 130 through control line 135, monitor line 136, and keypad/ID reader signal 137; and EVSE 140 through control line 145, monitor line 146, and keypad/ID reader signal 147.

Several implementations of control line 125 are possible. Line 125 could be the power line to EVSE 120, in which case controller 110 comprises the contactors or solid-state relays to open and close the power circuit for EVSE 120. Alternatively, line 125 could control the coil of a relay or contactor at or inside of EVSE 120, causing the power to switch remotely. In still another embodiment, some EVSE provide an 'inhibit' input, for example as might be used to accept a load shedding signal, and would cause the EVSE to respond by activating or releasing its own contactor or other power control circuits. And still another embodiment would have control 125 managing the communication between the vehicle 121 and EVSE 120. Typically, the connection from an EVSE to electric vehicle uses a standard interface, e.g., the Society of Automotive Engineers J1772 connector and signaling standard, which defines, among other things, a pilot signal. Control 125 might cause this pilot signal to be interrupted (or connected), which would cause vehicle 121 to stop (or start) drawing power.

Several implementations of monitor 126 are possible. In some embodiments, the EVSE 120 may have a metering capability that can be reported to controller 110 by serial communication (e.g., RS-232) or other standard. A current meter may be placed around the power feeds to EVSE 120 and monitored by controller 110. Such a current meter may be threshold based, i.e., indicating whether or not a vehicle is drawing in excess of Level 1 (a 15 A draw), or may be linear (i.e., read out exactly how much current is being drawn). In still other embodiments, a true RMS power meter may be used, revenue grade or otherwise, at each EVSE, or a single one in the controller 110. If more than one EVSE is to be operating simultaneously, an observation could be made as each EVSE is activated, to determine the incremental power draw by each vehicle. The total power draw of each vehicle could be interpolated from the incremental power draw observed as each EVSE is turned on and later turned off, over the repeating cycles, as discussed below.

Figure 2:
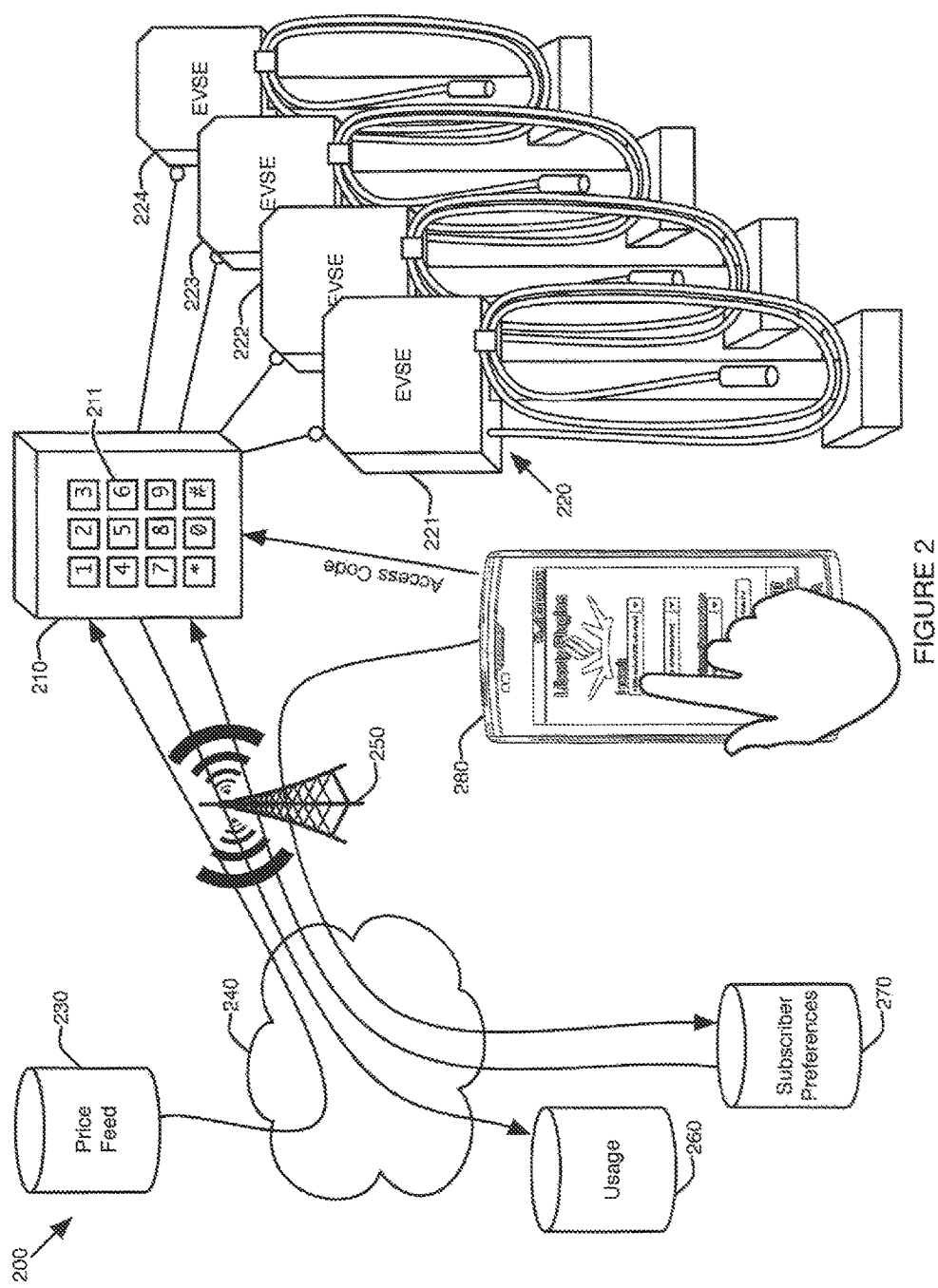
FIG. 2 is a system block diagram for a different embodiment, electric vehicle charging system.
Figure 10:
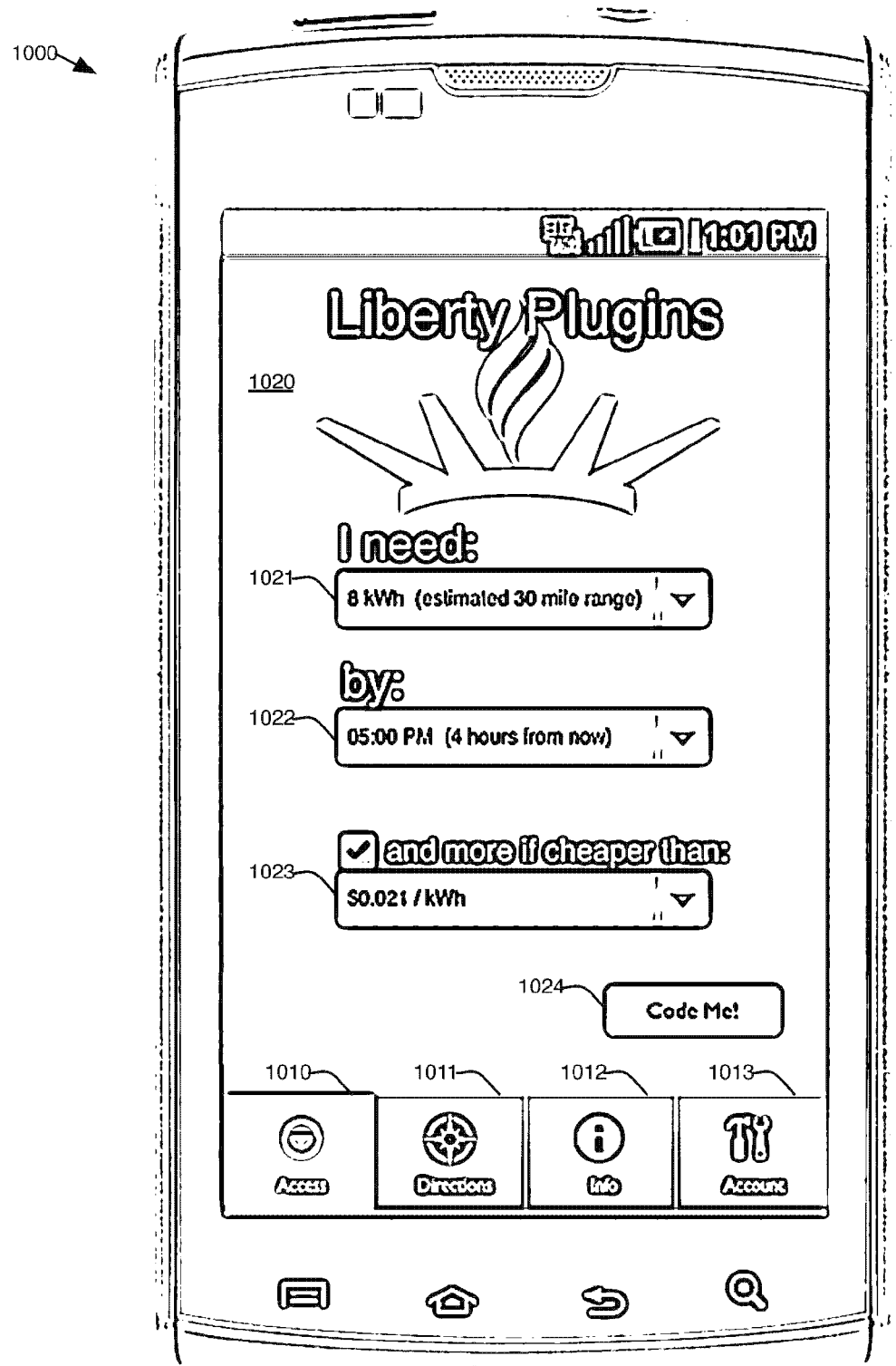
FIG. 10 shows an example user interface for an application that can run on mobile smartphone or other device to provide preferences to an EVSE management system.

FIG. 2 is a system block diagram for a different example embodiment, electric vehicle charging system 200. Here, a mobile device 280 may set or access the subscribing user's account preferences (locally or remotely) and may consolidate those into an access code representing not only the user's account identification, but optionally also the preferences for energy requirements and optional further energy purchase. An example user interface for such a device is shown in FIG. 10. The access code so generated may be a rolling code, valid only for a particular interval of time, or may be static. The access code may be displayed for the user to enter into keypad 211 on controller 210 of bank 220 comprising EVSEs 221-224. In an alternative embodiment, the access code may be presented to the controller 210 via Bluetooth, as a barcode (where controller 210 has a corresponding camera or reader), etc. Controller 210 may have wireless communication (e.g., through GPRS communications 250), or may be wired to achieve network communication, or use another techniques (e.g., "data mule") for obtaining prices and/or reporting status and usage.

FIG. 3 is one example embodiment of an energy price file 300 containing electricity prices as projected over several intervals in the near future (e.g., for the next hour in 15-minute intervals) as might be provided by rate servers 112 and 230.

FIGS. 4A and 4B, together, show one example embodiment of a usage report file 400 containing records of EVSE use authorized to the accounts of individual users, tracking when and how much electricity was used, and at what price.

Figure 5:
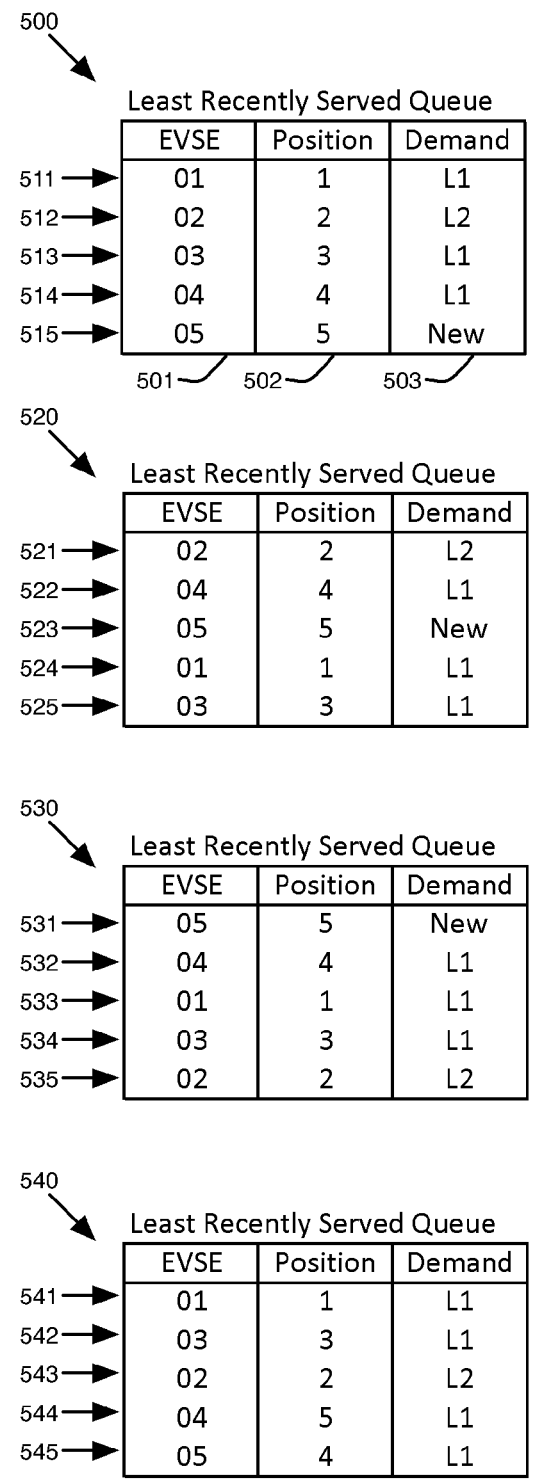
FIG. 5 shows the progression of a queue or five vehicles plugged into five corresponding EVSEs.

FIG. 5 shows the progression of a queue, in this example for five vehicles plugged into five corresponding EVSEs. In queue state 500, the least recently served vehicle (i.e., vehicle having waited the longest for a turn to charge) is in the first row 511. Some of the vehicles (those corresponding to rows 511, 513, 514) are known to charge only at Level 1 (i.e., at not more than 15 A), whether because of EVSE limitation, user preference, or vehicle status. One vehicle, corresponding to row 512, is known to charge at Level 2 (i.e., up to 30 A), which must be supported by the vehicle, the EVSE, and be acceptable to the user's preferences. If, according to a particular limitation (which may be a technical limit or one of policy), at most two vehicles may charge simultaneously at Level 1, or a single vehicle at level 2, then given the queue state 500, the EVSEs of rows 511 and 513 may be selected for charging. The policy used here gives the head of the queue (row 511) priority, and since row 511 is known to run at L1, there is capacity available for another L1 vehicle. However, the next row 512 is L2, and would exceed the aggregate limit, so the next L1 vehicle (found in row 513), if any, is selected. Some time later (e.g., after a 10 or 20 minute interval), a new turn or cycle may begin, however, queue state 520 is now the case, with the just-charging EVSEs in rows 524, 525 now moved to the end of the list. At 520, the head of the queue in row 521 is an L2, and is the only vehicle that can charge for the next interval. At 530, EVSE 02 has been moved to the tail of the queue, having just charged, and rows 522 and 523 have percolated to the head of the queue. Insofar as EVSE 05 has a new vehicle whose charge rate is not yet established, were row 522 to be sent to the head of the queue at L1, it would be a risky move to allow EVSE 05 (row 523) to attempt charging without determining the vehicle charge capacity: If the new vehicle turns out be L1, great, but if L2, the system has exceeded the desired limit. But if EVSE 05 were skipped over (and left unknown), EVSE 01 would get a second charging turn before EVSE 05 had a first turn. In this circumstance, the two rows at the head of the queue are switched, and charging begins first on row 531 (EVSE 05, with the new vehicle). If the demand is light, i.e., L1, then row 532 can be activated, and the two can charge together. However if EVSE 05 were determined to be L2, then, depending upon policy, either it could be allowed to finish a cycle alone (since, in this configuration, L2 must charge alone), or it could be halted, returned to the second position in the queue, and EVSEs 04 and 01 allowed to charge, with EVSE 05 charging on the next cycle. Once EVSEs 05 & 04 (rows 531, 532) have charged a turn, the queue state 540 has come around, and EVSE 01 (row 541) is back at the top.

In some embodiments, each time an entry in the queue gets passed over and a later entry in the queue is allowed to charge instead, a count may be accumulated that extends the charge duration when the passed over entry can charge.

Other mechanisms may be implemented to enhance the 'fairness' of the queue, yet still maintain a good use of the capacity.

With respect to FIG. 5, for simplicity, the discussion has been in terms of Level 1 and Level 2 charging, to illustrate a simple rule. However, if the system provides greater precision in monitoring, for example if actual currents are measured and provided to controller 110, the system could operate with a current-based constraint, e.g., do not exceed an aggregate draw of 40 A. This way, for example in an employee parking lot, where the electric vehicles are all parked and plugged into the EVSEs for many hours, toward the end of the day, each of the vehicles might only be drawing a few amps and it could be the case that more than just two vehicles could be charging and still not exceed the 40 A limit. Alternatively, readings from a true RMS power meter could be used, as discussed in conjunction with FIG. 1.

Figure 6:
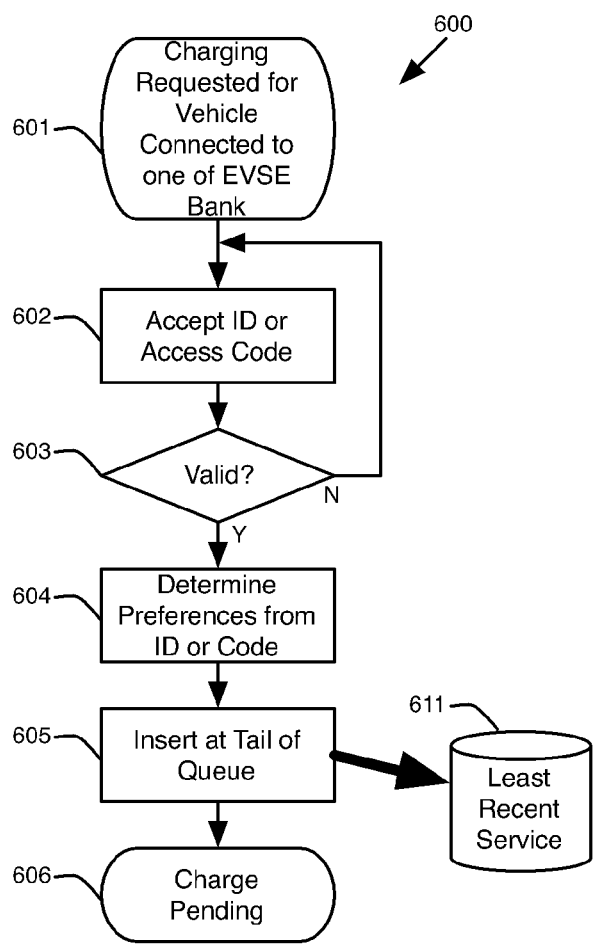
FIG. 6 shows a flowchart for an EVSE management process of adding a vehicle at an EVSE to the queue.

FIG. 6 shows a flowchart for one example EVSE management process 600 of adding a vehicle at an EVSE to the queue. Upon being accepted, the vehicle is inserted at the tail of the queue. The management process 600 begins at 601, where charging is requested for a vehicle connected to one EVSE of a bank of EVSEs. At step 602, an identification (e.g., an account ID) or an access code is accepted. A determination is made at step 603 as to whether the identification or access code is valid. If not, the process loops back to step 602, but if it is valid, then the process continues at step 604, where charging preferences are determined, e.g., looked up in account preferences database 115 using either the identification or an identification represented in the code, or in an other embodiments, a preference represented by the code. At step 605, for this embodiment, the vehicle is placed at the tail of the queue 611 of vehicles having the least recent service, at which point the management process 600 concludes at step 606 with the vehicle at the EVSE awaiting its now-pending turn to charge.

Figure 7:
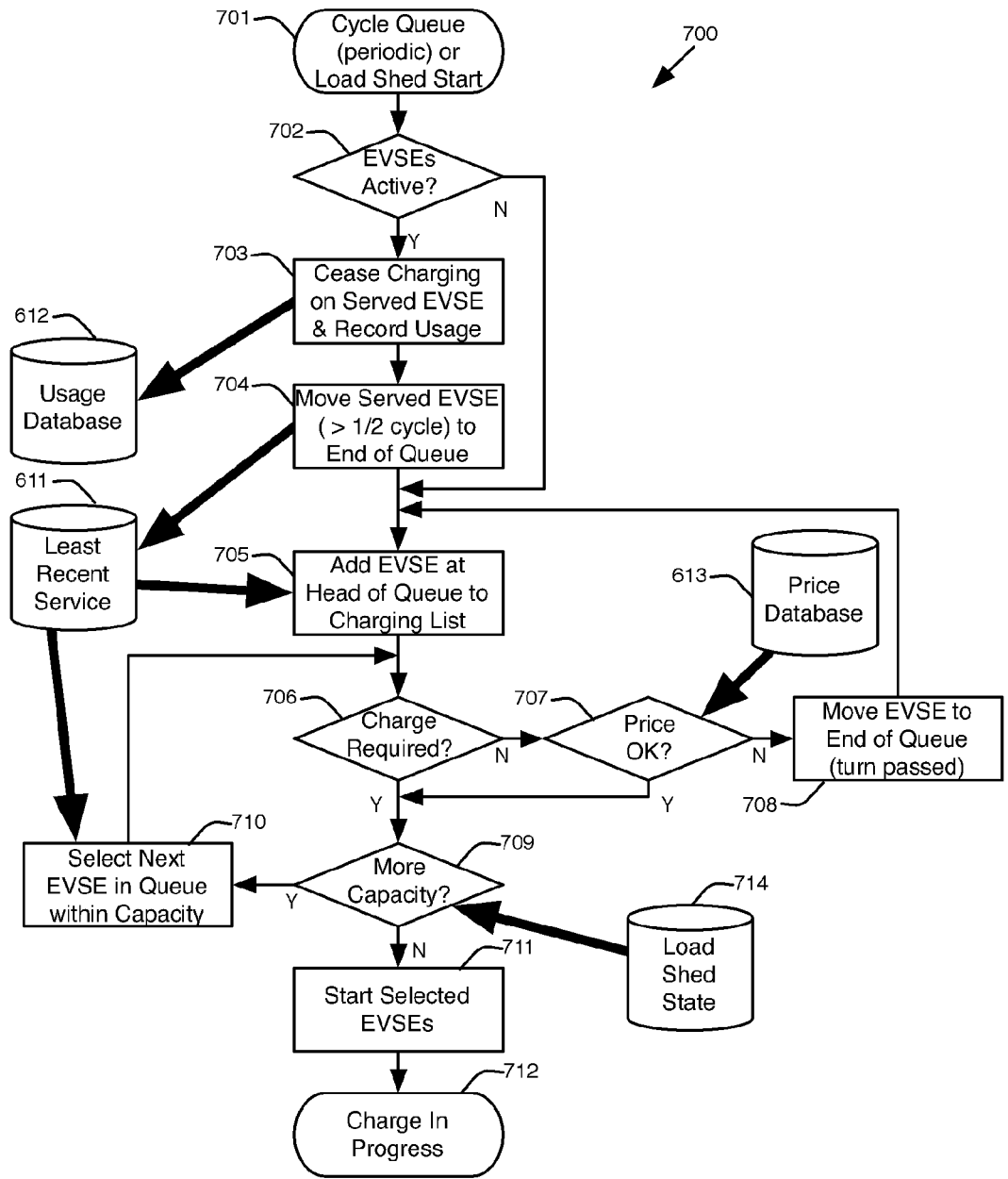
FIG. 7 shows a flowchart for an example EVSE management process to periodically to reassign the charging status on the basis of the queue, user preferences, the price of electricity, or call for a load shed event.

FIG. 7 shows a flowchart for one example EVSE management process 700 to periodically to reassign the charging status on the basis of the queue, user preferences, the price of electricity, or call for a load shed event. In this example, management process 700 begins at step 701 periodically (e.g., according to policy, such as to cycle every 20 minutes), but further may be initiated upon the start of a load-shed event. At step 702 a determination is made as to whether any EVSEs in the managed bank are active. If no, processing continues at step 705, but other wise, at step 703 charging is halted at the active EVSEs and the usage by the corresponding attached vehicles is recorded in usage database 612. At step 704, the vehicles having just been serviced are moved to the end of the queue 611 if they received less than one-half of a cycle (e.g., less than 10 minutes of charging when the cycle time is 20 minutes). As this is merely a policy, a different fraction or an amount of energy might be chosen instead, without departing from the teaching: For example, this would apply to vehicles whose turn in the queue had come up, but had been interrupted by a load-shed event.

At step 705, the vehicle at the head of the queue 611 is selected. A determination is made at step 706 as to whether this vehicle has an amount of charge required (from the preferences determined at step 604), regardless of price, and if so, processing proceeds to step 709 with the EVSE corresponding to the vehicle being one of those designated as selected. However, if the preferences associated with the vehicle at step 604 do not specify an amount of charging required regardless of price, then at step 707 a determination is made as to whether the preferences would accept energy if the current price, e.g., from price database 613 were acceptable, and if so, then the process proceeds to step 709, again with the EVSE being selected. However, if at 707 the price for charging is too high, or if the preferences do not allow for additional energy purchase, then at step 708, the vehicle is moved to the end of the queue 611, and its turn is passed. In this way, vehicles are provided with relatively equal access to energy when the price is lower, but are still able to obtain a charge by a required amount of energy if demanded by the preferences.

At step 709, if more capacity is available (including consideration for the current load-shed state 714) than is currently reserved for the already selected vehicles, then at step 710, the next vehicle having a charging rate that will not exceed the remaining capacity is pulled from the queue 611 and the associated preferences examined beginning at step 706. In this way, as much of the available capacity is allocated, while maintaining a fair access policy and not exceeding predetermined power limits. At step 711, the selected vehicle or vehicles begin charging from their respective EVSEs and management process 700 concludes at step 712 with charging in progress.

Figure 8:
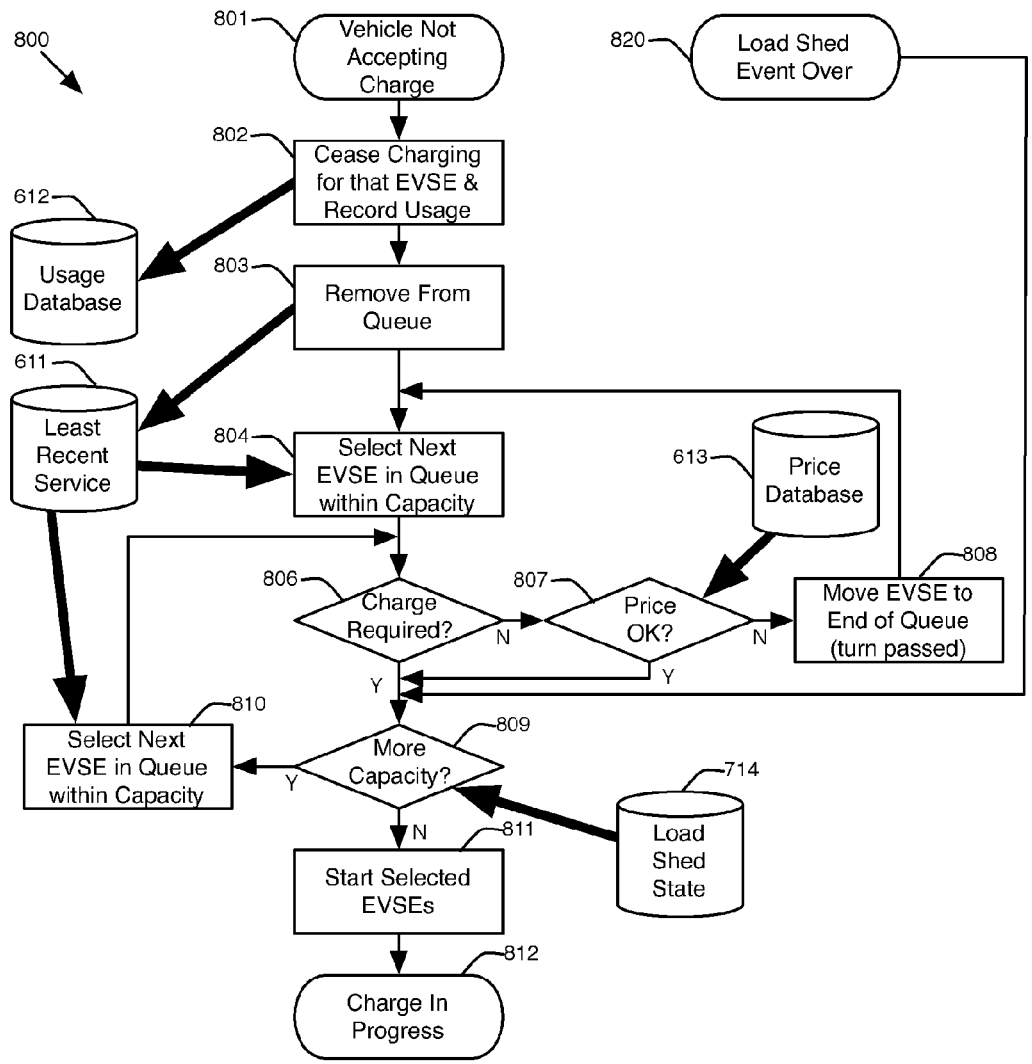
FIG. 8 shows a flowchart for an example EVSE management process for when a vehicle is no longer accepting a charge (i.e., it is full, or has been unplugged and driven off), or a load-shed event is concluded.

FIG. 8 shows a flowchart for one example EVSE management process 800 for when a vehicle is no longer accepting a charge (i.e., it is full, or has been unplugged and driven off), or a load-shed event is concluded. Management process 800 is generally similar to process 700, but is triggered by more capacity asynchronously becoming available, either by a vehicle no longer accepting a charge at step 801, or by the conclusion of a load-shed event 820.

When a vehicle ceases to accept a charge at 801, e.g., because it has been unplugged or because its battery is fully charged, then at step 802 the corresponding EVSE is stopped, the usage recorded in usage database 612, in association with the identifier acquired at step 602, and at step 803, the vehicle and its corresponding EVSE are removed from the queue 611. At step 804, a selection is made from the queue for the next vehicle and corresponding EVSE whose charging characteristics are within the remaining capacity. Steps 806, 807, 808, 809, 810, 811, and 812 are the same as steps 706, 707, 708, 709, 710, 711, and 712, respectively.

When a load-shed event is over at step 820, processing continues at step 809, where a determination is made at 809 as to whether more capacity is available. As load-shed state 714 has just changed to indicate no on-going load-shed event, the permitted capacity is greater than when limited during a load-shed event, and as such processing will continue at 810, as above, to select the next vehicles in queue for charging with the unused capacity.

Figure 9:
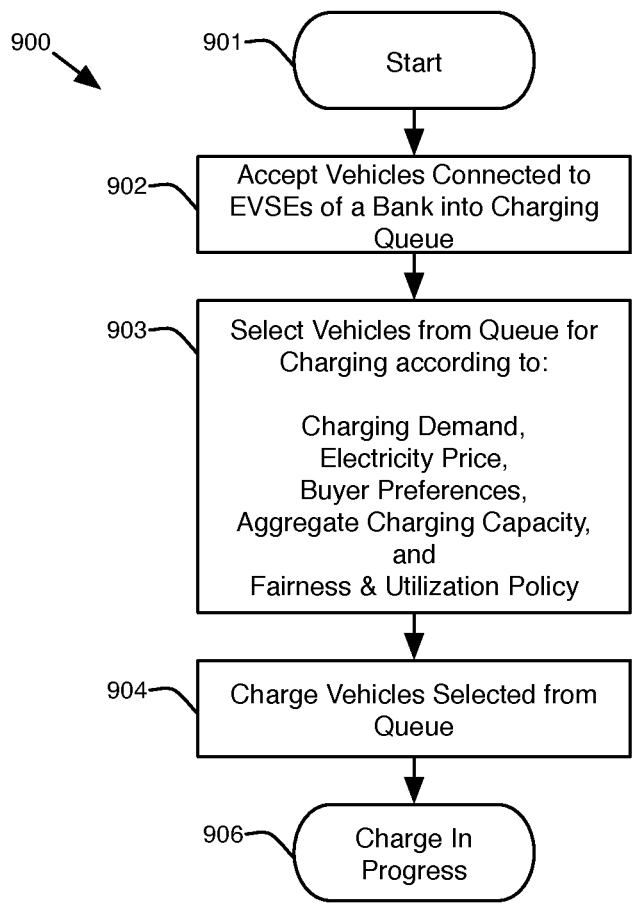
FIG. 9 shows a flowchart for another EVSE management process for managing a bank of EVSEs.

FIG. 9 shows a flowchart for another example EVSE management process 900 for managing a bank of EVSEs, starting at 901 wherein at step 902 process 900 accepts vehicles connecting to the EVSEs of a bank of EVSEs, (e.g., EVSEs 120, 130, 140, as managed by controller 110; or EVSEs 221-224 managed by controller 210) and enters them into the charging queue. At step 903, vehicles are selected from the queue according to one or more of charging demand, electricity price, buyer preferences, aggregate charging capacity, and a policy for fairness and utilization. At 904, the EVSEs corresponding to vehicles selected from the queue are charged. The process 900 concludes at 906 with the selected vehicles charging.

FIG. 10 shows one example user interface 1020 for an application that can run on mobile smartphone 1000 or other device to provide preferences to the EVSE management system (e.g., 110, 210) allowing the setting of charge requirements 1021 (e.g., as an amount of energy and/or as a range of travel for the particular vehicle) by a particular time 1022, and a selection to accept additional charging (up to the battery's limit), while the price is not greater than a particular value 1023. In this embodiment, these preferences can be rendered as a code for entry into keypad 211 by pressing button 1024, or in other embodiments, the preferences could be transmitted to server/database 115 or 270, rendered as a barcode readable by the EVSE management system, or sent to the EVSE management system wirelessly (e.g., via Bluetooth). Other functions offered by the UI may include additional account management 1013, information about the app or currently location 1012, and directions to a nearby EVSE 1011.

Several descriptions and illustrations have been presented to aid in understanding the present invention. One skilled in the art will understand that numerous changes and variations may be made without departing from the spirit of the invention. Each of these changes and variations is within the scope of the present invention.

The invention claimed is:

1. A system for managing banks of Electric Vehicle Service Equipment (EVSEs) comprising:
    a controller, the controller having control over a plurality of EVSEs in a bank, the controller having a queue of requests for charging corresponding to at least one of the EVSEs in the bank,
    wherein the controller determines a load-shed state and
    if the load-shed state is no on-going load-shed event, then the controller selects, from the queue of requests, a first set of corresponding EVSEs to be active, the first set having a first aggregate draw up to a first predetermined limit,
    otherwise, the controller selects, from the queue of requests, a second set of corresponding EVSEs to be active, the second set having a second aggregate draw that does not exceed a second predetermined limit, the second predetermined limit being less than the first predetermined limit.

2. The system of claim 1, wherein the controller further has access to user preferences indicating a minimum energy requirement and the controller removes a corresponding request from the queue once the minimum energy requirement has been met.

3. The system of claim 2 further comprising a user interface on a mobile device to set the user preferences and to provide the user preferences to the controller.

4. The system of claim 2 further comprising a user interface on a mobile device to set the user preferences and transmit the user preferences to a server, wherein the controller has communication with the server.

5. The system of claim 1, wherein the controller further has access to a price feed and user preferences indicating a minimum energy requirement and an acceptable price for additional energy, the controller skipping a corresponding request in the queue while the price feed indicates a current price for electricity that exceeds the acceptable price and the minimum energy requirement has been met.

6. The system of claim 5 further comprising a user interface on a mobile device to set the user preferences and provide the user preferences to the controller.

7. The system of claim 5 further comprising a user interface on a mobile device to set the user preferences and transmit the user preferences to a server, wherein the controller has communication with the server.

8. The system of claim 1, wherein the controller further has access to a price feed and user preferences indicating an acceptable price for energy, the controller skipping a corresponding request in the queue while the price feed indicates a current price for electricity that exceeds the acceptable price.

9. The system of claim 8 further comprising a user interface on a mobile device to set the user preferences and provide the user preferences to the controller.

10. The system of claim 8 further comprising a user interface on a mobile device to set the user preferences and transmit the user preferences to a server, wherein the controller has communication with the server.

11. The system of claim 1 further comprising an at least one current meter;
    wherein the aggregate draw is determined with the at least one current meter.

12. The system of claim 1 further comprising an at least one power meter;
    wherein the aggregate draw is determined with the at least one power meter.

13. A system for managing Electric Vehicle Service Equipment (EVSEs) comprising:
    a controller, the controller having control over a plurality of EVSEs, the controller having a queue of requests for charging corresponding to at least one of the EVSEs in the bank;
    wherein the controller determines a load-shed state and
    if the load-shed state is that a load-shed event is in progress, then the controller selects, from the queue of requests, a first set of corresponding EVSEs to be active, wherein a first aggregate demand by the first set results in a first draw from an electrical main not to exceed a first limit,
    otherwise, the controller selects, from the queue of requests, a second set of corresponding EVSEs to be active, wherein a second aggregate demand by the second set results in a second draw from the electrical main up to a second limit, the first limit being less than the second limit.

14. The system of claim 13, wherein the controller further has access to user preferences indicating a minimum energy requirement and the controller removes a corresponding request from the queue once the minimum energy requirement has been met.

15. The system of claim 14 further comprising:
    a user interface on a mobile device to set the user preferences and to provide the user preferences to the controller.

16. The system of claim 14 further comprising:
    a user interface on a mobile device to set the user preferences and transmit the user preferences to a server, wherein the controller has communication with the server.

17. The system of claim 13, wherein the controller further has access to a price feed and user preferences indicating a minimum energy requirement and an acceptable price for additional energy, the controller skipping a corresponding request in the queue while the price feed indicates a current price for electricity that exceeds the acceptable price and the minimum energy requirement has been met.

18. The system of claim 17 further comprising:
    a user interface on a mobile device to set the user preferences and provide the user preferences to the controller.

19. The system of claim 17 further comprising:
a user interface on a mobile device to set the user preferences and transmit the user preferences to a server, wherein the controller has communication with the server.

20. The system of claim 13, wherein the controller further has access to a price feed and user preferences indicating an acceptable price for energy, the controller skipping a corresponding request in the queue while the price feed indicates a current price for electricity that exceeds the acceptable price.

* * * * *